July 10, 1945. W. B. BRONANDER 2,379,878
STUD DRIVING AND TESTING MECHANISM
Filed Nov. 5, 1942 7 Sheets-Sheet 1

INVENTOR
Wilhelm B. Bronander
BY
Luther W. Hawley
ATTORNEY

July 10, 1945.  W. B. BRONANDER  2,379,878
STUD DRIVING AND TESTING MECHANISM
Filed Nov. 5, 1942  7 Sheets-Sheet 7

INVENTOR
Wilhelm B. Bronander
BY
Luther W Hawley
ATTORNEY

Patented July 10, 1945

2,379,878

UNITED STATES PATENT OFFICE 2,379,878

STUD DRIVING AND TESTING MECHANISM

Wilhelm B. Bronander, Montclair, N. J.

Application November 5, 1942, Serial No. 464,626

6 Claims. (Cl. 81—57)

This invention relates to stud driving and testing mechanism.

Studs are threaded at both ends and screwed into engine casings, cylinder blocks, etc., and casing parts such as cylinder heads are secured to the studs by nuts which are threaded on the outer threaded ends of the studs. Such studs are subjected to heavy loads and tremendous pressures and only studs having the proper size or fit can be utilized.

In the aircraft industry in particular, the proper mating of studs and stud holes is most important. It is essential that the studs be driven in under not less than a certain, predetermined torque, or the studs may shake loose. Moreover, it is absolutely essential that the torque drive does not exceed a predetermined limit as it has been found that if this torque is exceeded, after a certain number of hours of actual flight, the lugs or casing into which the studs have been screwed will crack.

Government specifications, for this reason, set minimum and maximum torque limits, but all studs are tested by manually operated torque wrenches. Such operations give a chance for sabotage and it is very difficult to detect.

At the present time it is usual to screw the studs in by hand, using large wrenches having sufficient leverage to furnish the necessary torque required to screw the studs in tightly. If the stud is too large it will not screw in to a sufficient extent and must, therefore, be unscrewed and rejected. On the other hand, if the stud is too small, relative to the size of the thread of the opening into which it is screwed, it will not be tight enough and, therefore, must be unscrewed and rejected. Oftentimes over size studs are broken off and must be removed.

The procedure above outlined is laborious, time consuming and expensive and, furthermore, is not productive of the required accuracy in sizing or grading the studs relative to the openings in which they are screwed.

This invention has for its salient object to provide a simple, practical and efficient method of selectively mating threaded studs to threaded openings and to mechanism for carrying out this method.

Another object of the invention is to provide a method and mechanism whereby oversize or undersize studs can be easily and quickly detected and removed from the threaded openings in which they are screwed and studs of the required size can be quickly screwed into the openings with the required torque.

Further objects of the invention will appear from the following specification taken in connection with the drawings which form a part of this application, and in which.

The method, briefly described, consists of driving the threaded stud into the threaded opening with a torque drive up to a predetermined minimum torque limit and to a predetermined depth, ejecting the stud if said depth is exceeded under minimum torque drive. If said depth is not exceeded the torque drive is increased to a predetermined maximum and the stud is again driven into the hole to a predetermined depth. If said depth is not reached the stud is ejected. If it is reached the stud is released from the drive and left in the hole.

The foregoing method is carried out by a machine comprising driving mechanism, a tool head having a chuck for receiving the stud to be driven, and driving connections between the driving mechanism and the chuck whereby the tool spindle or chuck may be driven in either direction at high speed or low speed. The drive transmitting mechanism between the drive mechanism and the chuck includes drive control means so constructed that minimum torque may be first applied to the chuck and stud carried thereby and if the stud satisfactorily withstands the minimum torque drive, maximum torque may be applied thereto. Suitable testing means is provided whereby the operator can easily and quickly determine whether the stud successively withstands the minimum and maximum torque drives.

Further details of the invention will appear from the following description.

Figures 1, 18:
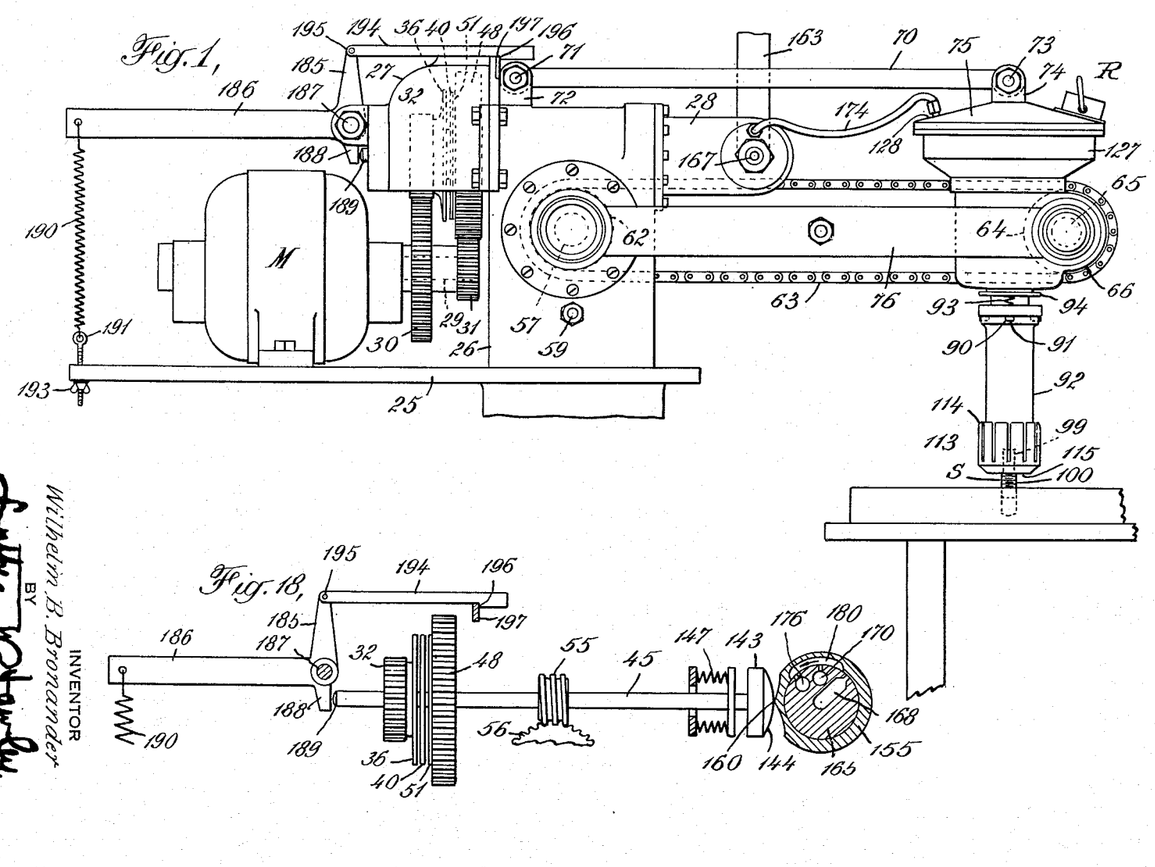
Fig. 1 is an elevational view of the machine constructed in accordance with the invention and adapted for use in carrying out the method.
Figs. 10, 11, 13, 14, 15, 17 and 18 are diagrammatic illustrations showing the various positions of adjustment of the driving connections and air control between the driving mechanism and the tool head.

In the embodiment of the invention illustrated in the drawings, the machine for carrying out the method, as shown in Fig. 1, is mounted on a support or base 25 which carries an upwardly extending casing 26 to which are connected supporting brackets or casings 27 and 28.

Figure 2:
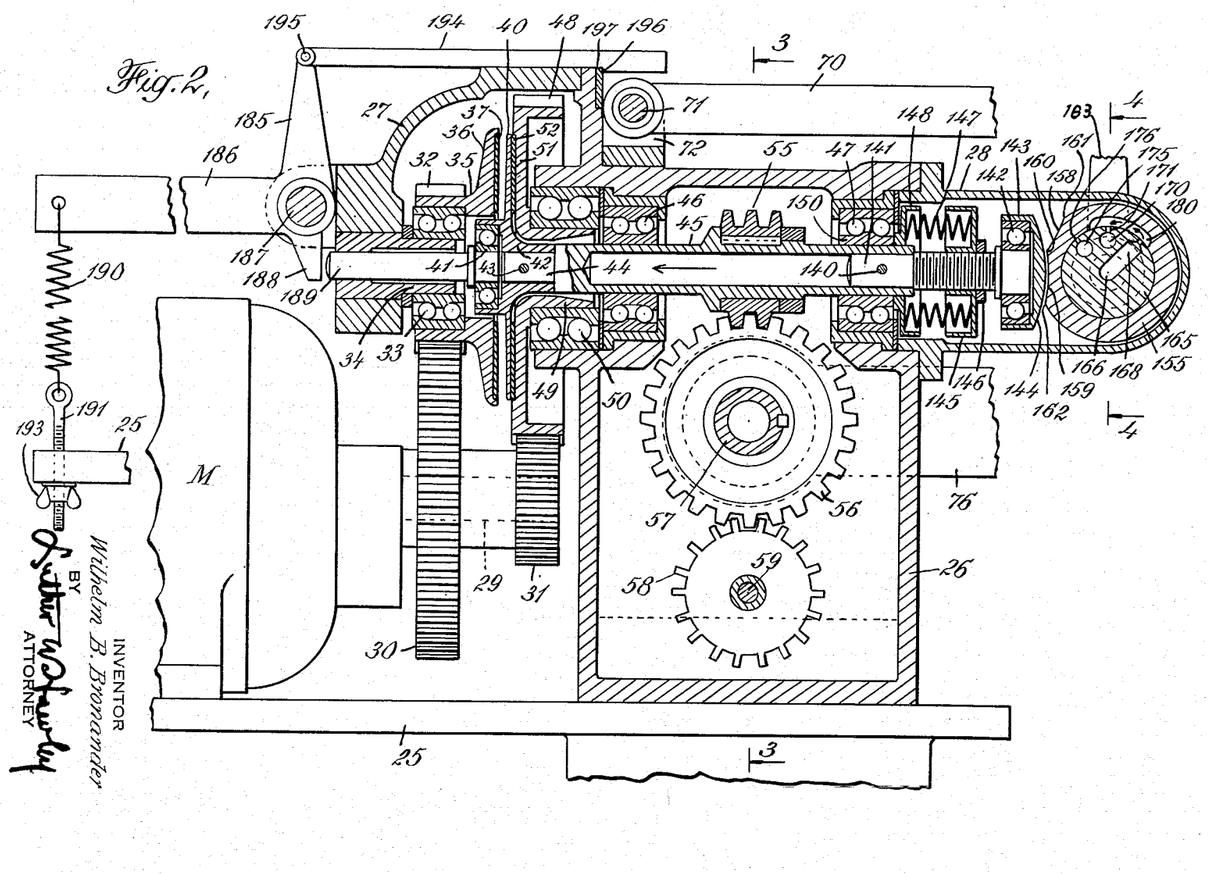
Fig. 2 is an elevational view, partly in longitudinal section, of the driving end of the machine shown in Fig. 1.

The mechanism, as shown in Fig. 2, is driven by a motor M having a shaft 29 on which is mounted a pair of gears 30 and 31. The gear 30 meshes with a gear 32 which is mounted on a ball bearing 33 carried by a sleeve 34 which is mounted in the bracket 27. The gear 32 has a hub 35 on which is formed or secured a driving disk 36 having a friction driving surface 37. The disk 36 forms one half of a high speed clutch and is adapted to drive a disk 40 mounted on a bearing 41 and having formed thereon a hollow sleeve 42. The sleeve 42, as shown at 43, is pinned to a shaft 44. The shaft 44 has formed integral therewith a hollow shaft 45 which is mounted in suitable roller bearings 46 and 47.

The gear 31 meshes with a gear 48 having a hub 49 mounted in a ball bearing 50. The gear 48 has a disk 51 formed integral therewith having a friction surface 52 adapted to coact with the other face of the intermediate clutch member or disk 40.

The intermediate clutch member or disk 40 is slidably or longitudinally movable on its axis so that the member 40 may engage the high speed clutch disk 36 or the low speed clutch disk 51.

Before describing the control mechanism by means of which the drive may be shifted from high speed to low speed or vice versa, the driving connections between the hollow shaft 45 and the tool head will be described.

The hollow shaft 45 has mounted thereon a worm gear 55 which meshes with a worm wheel 56 mounted on a shaft 57. The worm wheel 56 also meshes with a gear 58 mounted on a stub shaft 59 in the casing 26. This casing is preferably provided with a suitable lubricant which is picked up by the teeth of the gear 58 and is fed to the worm wheel 56 and worm gear 55, thereby providing efficient lubrication for these parts.

Figure 3:
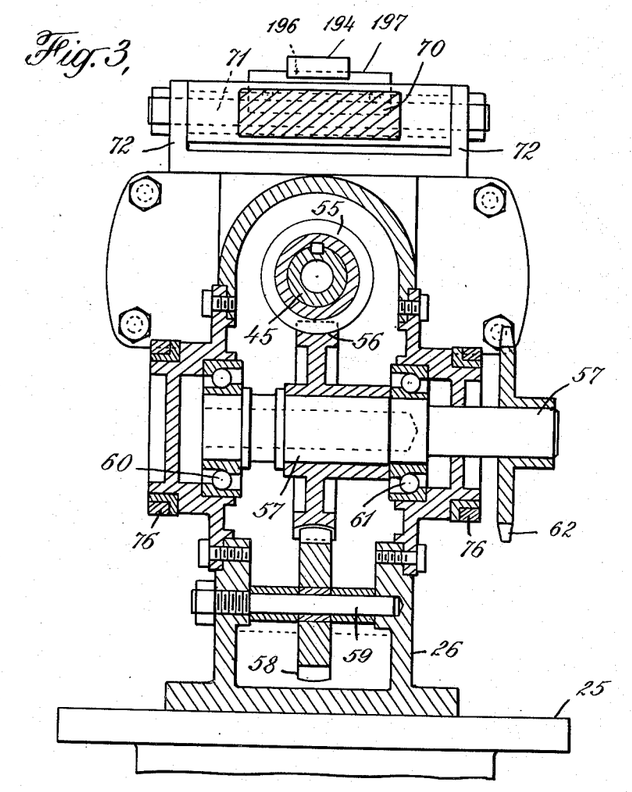
Fig. 3 is a vertical sectional elevation taken substantially on line 3—3 of Fig. 2, looking in the direction of the arrows.

The shaft 57, as shown particularly in Fig. 3, is mounted in suitable bearings 60 and 61. Shaft 57 has secured to one end thereof a sprocket wheel 62 which, as shown in Fig. 1, is connected by a chain 63 to drive a sprocket wheel 64 mounted on a shaft 65 which is carried by the tool head casing 66.

Tool head

The tool head casing is swung on a parallel link connection from the casing 26 in the following manner. A link 70 is pivoted at 71 to lugs 72 carried by the casing 26 and is pivoted at its opposite end, as shown particularly in Fig. 9 at 73, to a pair of lugs 74 carried by the cover or casing 75 of the tool head. The other links of the parallel link connection which supports the tool head casing are shown particularly in Figs. 1, 2, 3, 5 and 9. From these figures it will be seen that links 76 are pivoted on the axis of the shaft 57 and at their other ends are pivoted at the axis of the shaft 65. By means of this parallel link motion the tool head can move downwardly to feed the screw into the work or upwardly away from the work.

Figures 5, 6, 7, 8:
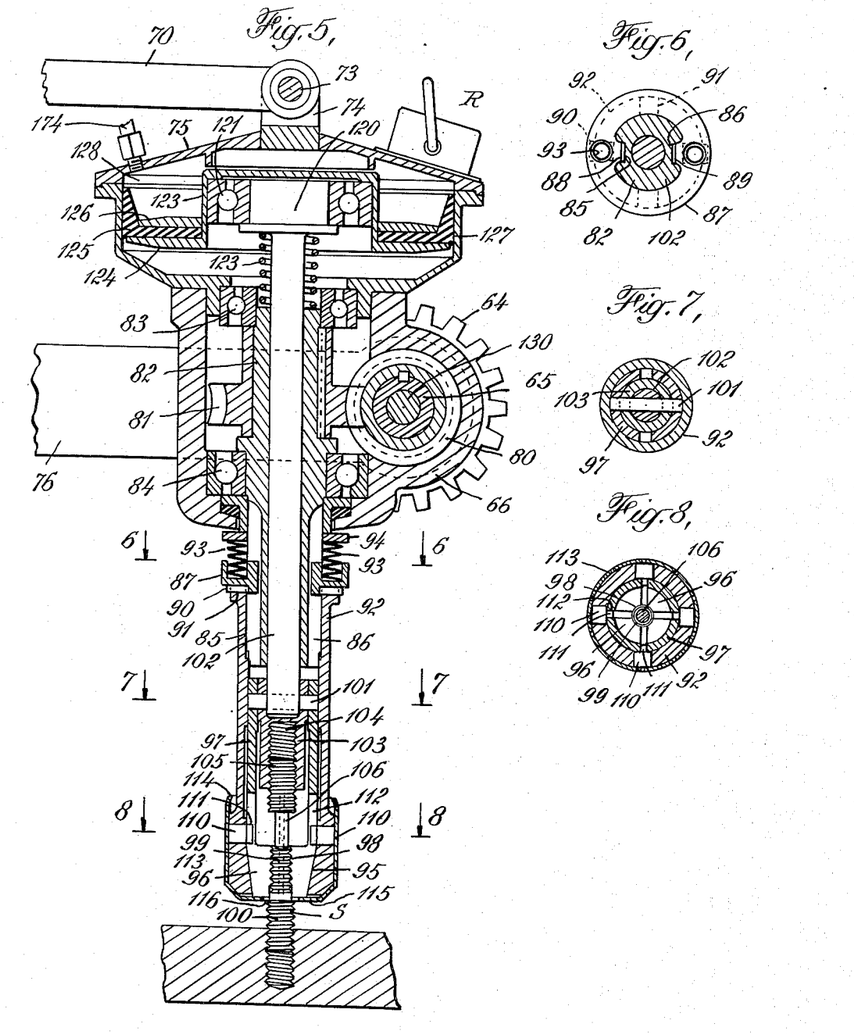
Fig. 5 is a vertical sectional elevation through the tool head, this view being taken substantially on line 5—5 of Fig. 9, looking in the direction of the arrows, Fig. 5 being on an enlarged scale.
Figs. 6, 7 and 8 are transverse sectional elevations through the tool head taken substantially on lines 6—6, 7—7 and 8—8 respectively, looking in the direction of the arrows.
Figure 9:
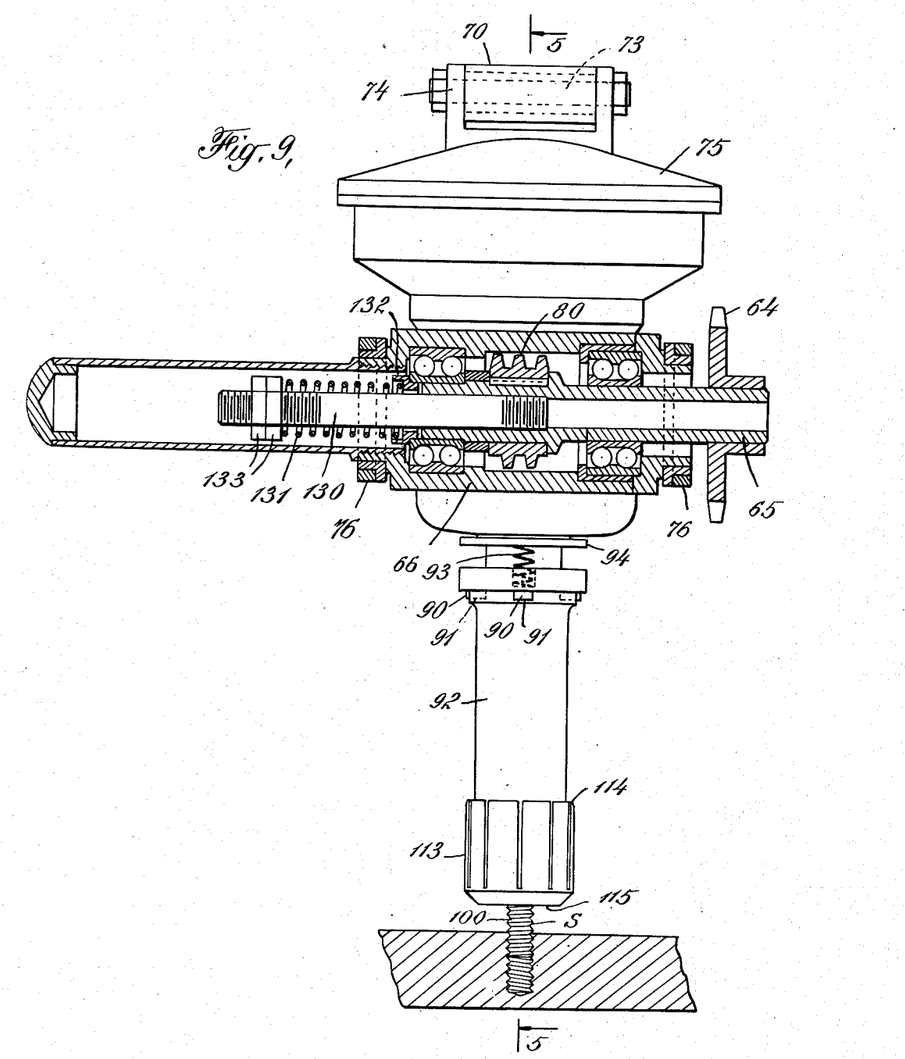
Fig. 9 is an elevational view, partly in section, taken at right angles to Fig. 5.

The shaft 65, as shown particularly in Figs. 5 and 9, has mounted thereon a worm gear 80 which meshes with a worm gear 81 mounted on a hollow shaft 82 supported in suitable bearings 83 and 84 in the tool head casing 66. The hollow shaft 82 has formed therein longitudinal grooves 85 and 86, as shown particularly in Fig. 6. A cup shaped collar 87 surrounds a portion of the hollow shaft and is provided with inwardly extending lugs 88 and 89 which seat in the grooves 85 and 86. The cup shaped collar 87 is also provided with diametrically opposite downwardly extending lugs 90 which engage correspondingly located and formed notches 91 formed in the upper surface of a sleeve 92 which surrounds the lower portion of the hollow shaft 82 and extends below said shaft.

The cup shaped collar 87 is held downwardly so that the lugs 90 will engage the depressions 91 by springs 93 which seat at their lower ends in a cup shaped collar and at their upper ends against an abutment 94.

The sleeve 92 has its lower end inwardly tapered, as shown at 95, to form a chuck or wedge which coacts under predetermined conditions to force inwardly jaws 96 of a collet 97. The jaws 96 are provided with internal threads 98 of a suitable pitch to receive one threaded end 99 of a stud S. The other end of the stud is also threaded, as shown at 100.

The collet 97 consists of a longitudinal sleeve which extends upwardly in the sleeve 92 and is connected by a pin 101 to a plunger 102 slidably mounted in the hollow shaft 82. The pin 101 also secures within the collet sleeve 97, a sleeve 103 which extends downwardly in the collet sleeve 97 and is internally threaded at 104. The threaded opening 104 receives a threaded stud 105 which carries a stop pin 106 which determines the extent to which the threaded end 99 of the stud S is screwed into the collet or chuck. The pin 106 is adjustable by vertically adjusting the threaded stud 105 in the threaded opening 104 in the sleeve 103.

The collet is driven from the sleeve 92 by means of the structure illustrated particularly in Figs. 5 and 8. As shown in Fig. 8, four lugs 110 are carried by the lower end of the sleeve 92. These lugs have reduced extensions 111 which extend inwardly and form vertical ribs which are received in vertical slots or grooves 112 formed in the collet sleeve 97.

The lower end of the chuck or sleeve 92 has loosely mounted thereon a cylindrical cup or sleeve 113 having a retaining flange 114 at its upper end and having an inwardly extending flange 115 at its lower end, the flange 115 having a central opening 116 and extending beneath the lower ends of the collet jaws 96. These jaws are formed by upwardly extending slots in the lower end of the collet sleeve 97. The manner of using the testing sleeve or cup 113 will be hereinafter described.

The plunger 102 is carried by a plunger head 120 mounted in a bearing 121, the plunger being held in its upward position of movement by a spring 122. The head 120 and bearing 121 are mounted in an inverted cup 123 having a laterally extending flange 124. A piston 125 is mounted between a disk 126 and the flange 124 and is positioned in a cylinder 127 formed in the upper end of the tool casing. A suitable fluid is admitted to the cylinder chamber 128, as hereinafter described, and when this fluid under pressure is admitted to the chamber 128, the piston 125 is depressed in the cylinder 127 carrying with it the plunger 102. As the plunger is depressed, the collet and collet jaws are forced downwardly in the sleeve 92, the chuck 95 causing the jaws to tightly grip the threaded end 99 of the stud S which has been previously inserted in the collet jaws in a manner hereinafter described.

Since the drive between the shafts 65 and the hollow shaft 82 is transmitted through a worm gear drive mechanism, when the torque or resistance encountered as the stud S is screwed into the work exceeds a predetermined amount, the stud S can no longer rotate and the worm gear 80 will tend to move longitudinally on a shaft 65. In order to prevent this movement, the mechanism shown in Fig. 9 is provided. From this figure it will be seen that the shaft 65, which is hollow, has threaded thereinto a stud or rod 130 on which is mounted a spring 131 which seats in a cup 132 at one end and at its opposite end against adjusting nuts 133 threaded on the stud 130. The spring tension obtained by the use of the spring 131 will tend to prevent the relative movement of the gear 80 to the left and axially of the shaft 65 as indicated by the arrow in Fig. 2.

*Drive transmission and control mechanism*

Figure 4:
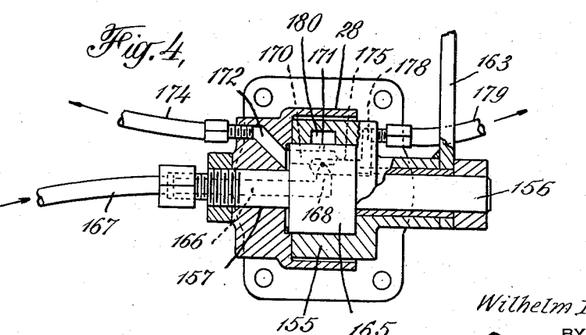
Fig. 4 is a sectional elevation through the control valve mechanism taken substantially on line 4—4 of Fig. 2.

This mechanism is particularly shown in Figs. 2 and 4 and the settings for the operations performed are illustrated diagrammatically in Figs. 10 to 18 inclusive.

As shown in Fig. 2, the hollow shaft 45 has pinned thereto at 140, a shaft 141. On the outer end of the shaft 141 is mounted on a ball bearing 142, a cap 143 having an arcuate surface 144. A collar 145, cup shaped in cross section, is mounted on the shaft 141 and is held in the desired position by adjustment by means of a nut 146 which is threaded onto the shaft 141. Springs 147 engage the cup shaped collar 145 and also set in a flanged collar 148 which seats against the inner ball race 150 of the ball bearing 47 and rotates therewith.

The springs 147 are adapted to provide a minimum driving torque in the following manner.

Since the drive between the shaft 45 and the shaft 57 is transmitted through worm driving mechanism, when the stud S encounters a predetermined resistance, the worm gear 56 will be prevented from rotating, thereby causing the worm gear 55, which is still being driven, to move lineally in the direction of the arrow in Fig. 2. Movement of the worm gear 55 in this direction will tend to cause the shaft 45 to move toward the left, viewing Fig. 2, thus moving the intermediate clutch transmitting plate or disk 40 relative to the driving disk or clutch member 51, to a sufficient extent to limit the torque transmission to a predetermined setting. In order to permit the stud to be screwed in to the desired extent or with a minimum torque driving effort, the springs 147 are provided. These springs, as clearly shown in Fig. 2, tend to move the shaft 45 to the right viewing Fig. 2, thus partially counteracting the tendency of the shaft to move toward the left due to the slowing down or stopping of the worm wheel 56. The springs 147 are so chosen as to accomplish the foregoing result to the desired extent.

This torque yielding or torque limiting action takes place on forward drive only. However, when the drive is in reverse the worm gear 56 will tend to move the shaft 45 to the right, viewing Fig. 2. Thus, the thrust reaction clamps the clutch disk 40 to the driving disk 51, giving practically a positive reverse drive. This is particularly important under a condition encountered when the stud has been driven in under maximum torque but has not been driven far enough into the work. It has been found that after a stud has been driven in under predetermined torque a much greater torque is required to loosen and unscrew the stud. By thus forcing the clutch disk 40 into tight engagement with the driving disk 51 the necessary additional torque effort required to loosen and remove the stud is provided.

The position of the shaft 45 and the intermediate clutch member 40 carried thereby is determined by a cam 155 carried by a spindle or stub shaft 156 rotatably mounted in a bearing 157 formed in the bracket or casing 28.

The cam 155 has formed thereon two concave cam surfaces 158 and 159 which are separated by a ridge 160. Furthermore, the outer edges of the concave surfaces 158 and 159 are bordered by ridges 161 and 162.

The cam 155 is manually controlled by a handle 163. When the cam is positioned as shown in Fig. 2, the cap 143 is disposed opposite the concave surface 159 which is so formed that the shaft 45 is positioned to permit the intermediate clutch member 40 to engage the clutch member 51 and thereby transmit the drive from the shaft 29 to the shaft 45 at low speed.

When the handle is moved to shift the cam 155 to the position shown in Fig. 18 in which the ridge 160 engages the cap 143, the shaft 45 will be so positioned as to dispose the intermediate clutch member or driven plate 40 between the clutch members 36 and 51 and thus no drive will be transmitted to the shaft 45.

Figure 10:
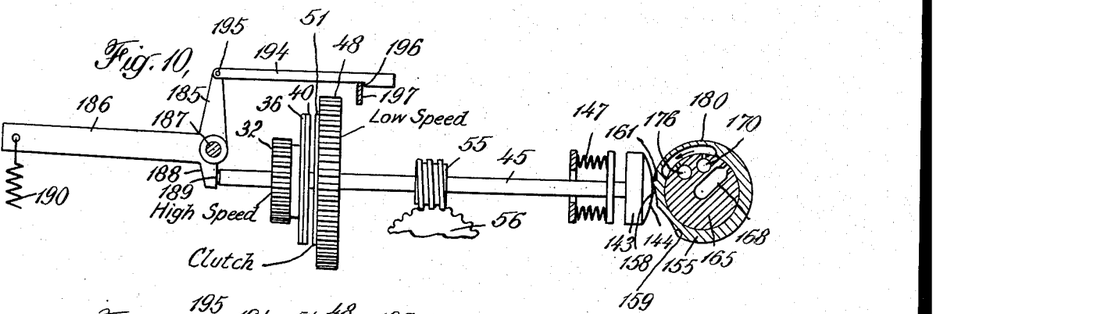

When the handle and cam 155 have been shifted to the position shown in Fig. 10 in which the cap 143 is disposed opposite the concave surface 158 and on ridge 161, the shaft 45 will be shifted to the left, thus engaging the intermediate clutch member 40 with the clutch driving member 36, thus transmitting the drive at high speed to the shaft 45. High speed is also transmitted when the cam is shifted to the position shown in Fig. 11 and the cap 143 is disposed in engagement with the ridge 162.

In addition to controlling the position of the driven disk 40 with reference to the driving disks 36 and 51, the cam and handle also control the passage of pressure fluid to the tool head cylinder chamber 128. This is accomplished in the following manner.

As shown particularly in Figs. 2 and 4, the cam 155 is rotatably mounted on a cylinder 165. A conduit 166 leads axially to the center of the cylinder and has connected thereto a supply pipe 167 which supplies fluid under pressure thereto. From the central conduit 166 the fluid passes radially through a conduit 168 to the periphery of the cylinder. The cylinder also is provided with a conduit 170 which communicates with the periphery of the cylinder through an opening 171 and also communicates with a conduit 172 in the casing 28 in which the cam is mounted. A pipe 174 communicates with the conduit 172 and leads to the chamber 128, as shown in Fig. 5. A third conduit 175 is formed in the cylinder 165 and communicates through an opening 176 with the periphery of the cylinder. Conduit 175 also communicates with a conduit 178 to which is connected an exhaust pipe 179.

In order to control communication between the various conduits within the cylinder 165, the cam 155 has formed therein a recess 180. This recess is arcuate in form, as shown in Fig. 2, and when the cam is adjusted, as shown in said figure, the air or fluid pressure from the conduit 168 passes through the recess 180 and through the opening 171 into the conduit 170 and thence through the conduit 172 and inlet pipe 174 to the chamber 128. As fluid under pressure is admitted to this chamber, the plunger 102 will be depressed, thus forcing the collet jaws 96 into tight gripping engagement with the threaded end 99 of the stud S.

When the cam is adjusted to the position shown in Fig. 10, the air inlet or supply conduit 166 (Fig. 4) does not communicate with the conduit 170 or with the conduit 172 and inlet pipe 174. Thus no air reaches the chamber 128 and the jaws 96 will not be forced downwardly into the chuck.

After the minimum torque drive has been transmitted to the tool and the stud has not been driven in too far thereby, as will be hereinafter explained, further torque or a maximum torque is applied in the following manner. A bell crank lever comprising arms 185 and 186 is pivotally mounted, as shown at 187, on the bracket 27. This lever has a downwardly extending lug 188 which is disposed opposite the outer end of a slidable stub shaft 189 positioned in axial alinement with the shaft 45. A spring 190 engages the outer end of the arm 186 and is adjustable by an eye bolt 191 which extends through the base member 25 and is engaged by a wing nut 193.

The spring 190 tends to rotate the bell crank lever in an anti-clockwise direction about the axis 187 and this rotation is normally prevented by means of a latch bar 194 which is pivoted at 195 to the outer end of the arm 185 and has at its opposite end a hook 196 which is adapted to engage a latch bar 197.

When the bar 194 is lifted, the spring 190 will rotate the bell crank lever in an anti-clockwise direction, causing the lug 188 to engage the outer end of the shaft 189 and to push this shaft inwardly against the outer end of the shaft 45, thus further resisting the tendency of this shaft to shift to the left and discontinue the drive between the intermediate clutch member 40 and low speed clutch disk 51. In this manner a maximum driving torque is permitted in driving the stud into the work before the drive is disconnected.

In order to unscrew the stud from the work in case the stud is not the proper size, a reversing switch R is provided for the motor M. This switch operates in the usual well known manner to reverse the motor and thereby to reverse the drive.

*Operation*

The cam 155 is moved by the handle 163 to the position shown in Fig. 10 in which the cap 143 on the right hand end of the shaft 45 is disposed opposite the cam surface 158 and on the ridge 161. This causes the shaft 45 to be shifted, engaging the intermediate clutch plate or disk 40 with the high speed driving disk 36.

When the cam has been shifted to the position shown in Fig. 10, it will be noted that the recess 180 in the cam establishes communication between the conduits 176 and 170, thus opening the chamber 128 of the chuck cylinder 127 to the exhaust. The fluid inlet conduit 168 thus does not communicate with the chuck cylinder and, therefore, the plunger 102 is not depressed and the collet is not forced down into the chuck into driving engagement with the stud. The stud S is held by hand so that the threads 99 on the upper end of the stud will engage the threads 98 on the collet jaws and the stud will be threaded inwardly at high speed until the upper end thereof engages the pin 106 which forms a stop.

Figure 11:
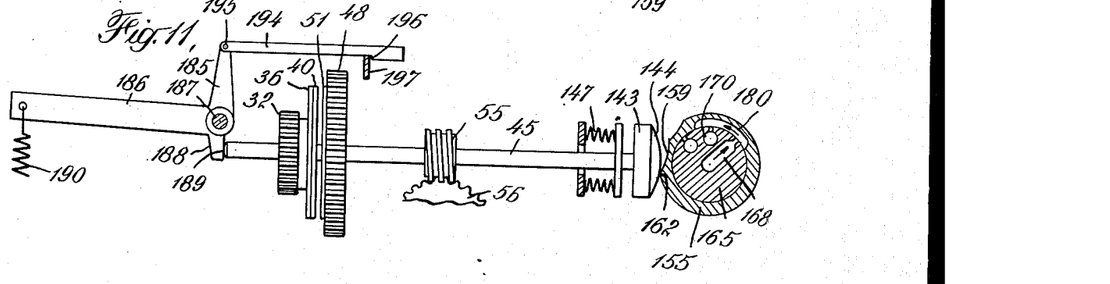
Figure 12:
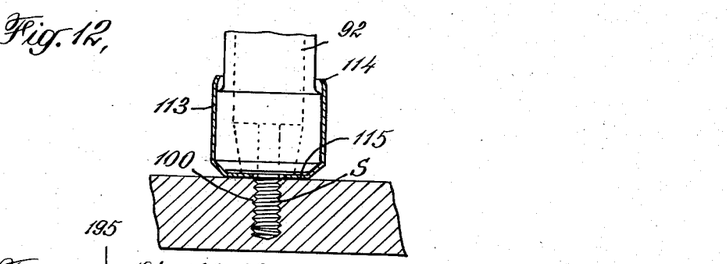
Fig. 12 is a vertical sectional elevation illustrating the inspection sleeve by means of which the operator determines whether the stud has been driven in too far with the minimum torque drive.

After the stud has thus been inserted in the collet jaws, the cam 155 is shifted to the position shown in Fig. 11, in which the pressure conduit 168 communicates with the conduit 170 through the recess 180 and pressure fluid is thus fed to the chuck cylinder chamber 128, causing the piston 125 and the plunger 102 to be forced downwardly into the chuck, thus forcing the collet jaws inwardly into driving engagement with the upper end of the chuck. It will be noted in Fig. 11 that the ridge 162 engages the cap 144, forcing the shaft 45 to the left, in which position the intermediate clutch member or driven plate 40 engages the high speed driving clutch member 36. The stud will thus be driven into the work until it is slowed down and tends to resist turning.

The cam is then shifted to the position shown in Fig. 2. In this position pressure fluid is fed to the clutch cylinder and the collet jaws are clutched in the chuck. The stud will be driven at slow speed and the minimum torque drive effected by the action of the spring 147. The operator then tests the operation by the cap 113. If the cap is clamped tightly by the collet jaws against the work, Fig. 12, this indicates that the stud has been driven in too far under the minimum torque drive and thus does not properly fit the opening in which it is driven. Under this condition the motor is reversed and the low speed driving member 51 driven in reverse loosens the stud from the work. As hereinbefore explained, the additional torque required for loosening the stud is available due to the fact that the worm gear tends to move the shaft 45 to the right, viewing Fig. 2, thus forcing the clutch disk 40 into tight clamping relation relative to the driving disk 51. The pressure fluid holds the collet jaws to be clutched in the chuck. After the stud is loosened, the cam is shifted to the position shown in Fig. 14, in which fluid under pressure is supplied to the chuck cylinder and the drive is transmitted at high speed, thus unscrewing the stud.

Figure 15:
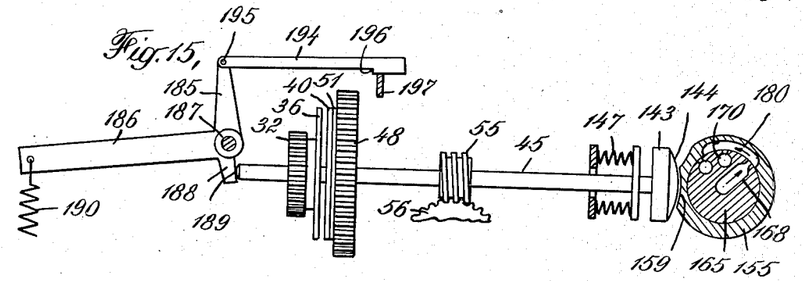
Figure 16:
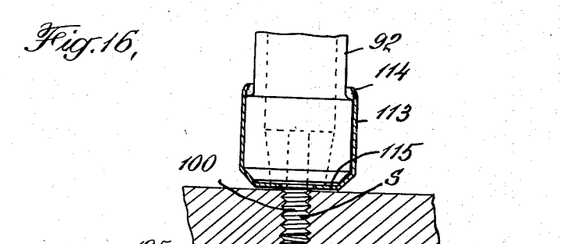
Fig. 16 is a view similar to Fig. 12 but showing the position of the inspection sleeve after the stud has passed the minimum torque test and has been driven in under maximum torque, the position of the sleeve indicating that the stud diameter is too large.

However, if after the stud has been driven in with the minimum torque effort the inspection cap 113 is loose, as shown in Fig. 16, then the maximum torque is applied at low speed in the manner indicated in Fig. 15. The maximum torque is applied by lifting the latch 194, thus permitting the spring 190 to shift the bell crank lever and through the lug 188 to apply force to the left hand end of the shaft 45. In Fig. 15 fluid pressure is applied to the chuck cylinder and the drive is transmitted from the low speed clutch member 51.

Figure 17:
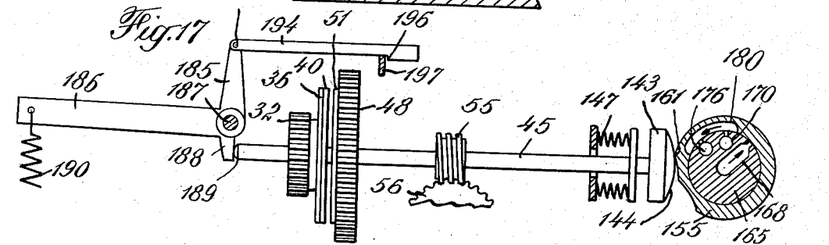

If after the maximum torque is applied the cap 113 is tightly clamped between the collet jaws and the work, this indicates that the stud does not exceed the maximum torque and the chuck is unscrewed from the stud in the manner shown in Fig. 17. When the cam is adjusted, as shown in Fig. 17, the cap 143 is engaged by the cam adjacent to the ridge 161, forcing the driven or intermediate clutch plate 40 into engagement with this high speed clutch driving member 36 and the fluid pressure is disconnected from the cylinder 127 in the manner above described in connection with Fig. 10. During this last operation, as illustrated in Fig. 17, the motor is reversed.

Figure 13:
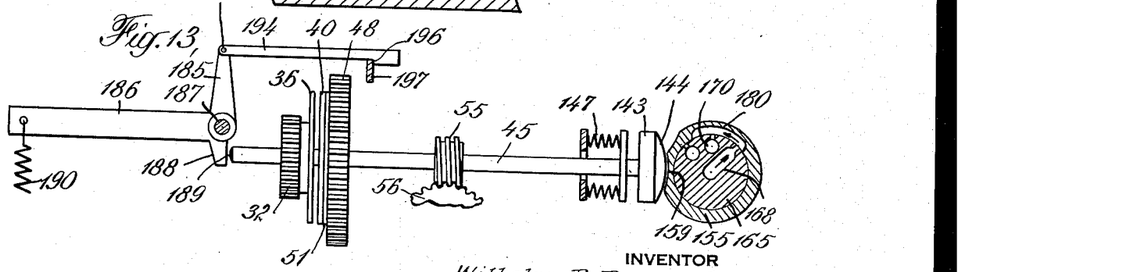
Figure 14:
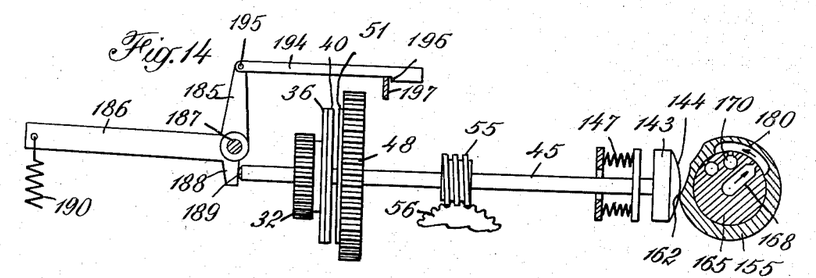

However, if the inspection cap is loose, as shown in Fig. 16, after maximum torque has been applied to drive the stud inwardly, this indicates that the stud is too large and the motor is reversed and the stud is unscrewed from the work in the manner indicated in Figs. 13 and 14.

Fig. 18 illustrates a condition where the drive is in neutral position, the cap 143 being disposed in engagement with the ridge 160. The intermediate clutch member or driven plate 40, as shown, is disposed between the high speed driving member 36 and the low speed driving member 51, no drive being transmitted to the driven shaft 45. In this figure no pressure fluid is transmitted to the clutch cylinder 127.

In the manner hereinbefore described, it will be seen that the stud is first driven in with a minimum driving effort and if the inspection cap is not clamped tightly, the latch 194 is lifted to apply the maximum driving effort at slow speed. If after this operation the inspection cap is loose, it indicates that the stud is too large and must be removed in the manner described. However, if the inspection cap is clamped tightly between the collet jaws and the work, this indicates that the stud has the proper fit and the chuck is unscrewed, leaving the stud in position.

It will be evident that the operations above outlined can be carried out easily and quickly and that a definite and positive check is available to the operator to indicate whether the stud is the proper size to fit in the opening in which it is screwed with a maximum driving torque.

Although one specific embodiment of the invention has been particularly shown and described, it will be understood that the invention is capable of modification and that changes in the arrangement and in the construction of the various cooperating parts may be made without departing from the spirit or scope of the invention, as expressed in the following claims.

What I claim is:

1. A stud screwing and testing machine comprising a chuck, chuck driving means for driving the chuck and stud carried thereby, said driving means including a releasable driving connection and means for holding said connection in operative position to transmit a minimum torque effort, said driving connection being inoperative beyond said minimum torque, manually controlled means associated with said driving connection for increasing the torque driving effort if the stud has withstood the minimum torque drive without being driven too far into the stud receiving opening, and testing means engageable by the operator and comprising a sleeve rotatably mounted on the chuck and having a portion extending between the chuck and the work for indicating to the operator the fit of the stud in the hole and the extent to which the stud has been driven under minimum torque drive.

2. A stud screwing and testing machine comprising a chuck, chuck driving means for driving the chuck and stud carried thereby, said driving means including a releasable driving connection and means for holding said connection in operative position to transmit a minimum torque effort, said driving connection being inoperative beyond said minimum torque, manually controlled means associated with said driving connection for increasing the torque driving effort if the stud has withstood the minimum torque drive without being driven too far into the stud receiving openings, and testing means engageable by the operator and comprising a sleeve rotatably mounted on the chuck and having a portion extending between the chuck and the work for indicating to the operator the extent to which the stud has been driven under minimum torque drive and under maximum torque drive.

3. A stud screwing and testing machine comprising a chuck, chuck driving means for driving the chuck and stud carried thereby with a predetermined minimum torque effort, said driving means being inoperative beyond said minimum torque, manually controlled means for increasing the torque driving effort if the stud has withstood the minimum torque drive without being driven too far into the stud receiving opening, and testing means comprising a cap loosely carried by and rotatable relative to the chuck and extending beneath the chuck and engageable with the work when the stud has been screwed in to a predetermined extent for indicating to the operator the fit of the stud in the hole and the extent to which the stud has been driven under minimum torque drive.

4. A stud screwing and testing machine comprising a chuck, chuck driving means for driving the chuck and stud carried thereby with a predetermined minimum torque effort, said driving means being inoperative beyond said minimum torque, means for increasing the torque driving effort if the stud has withstood the minimum torque drive without being driven too far into the stud receiving opening, and testing means comprising a cap loosely carried by and rotatable on the chuck and having a portion extending under the bottom of the chuck and engageable with the work when the stud has been screwed in to a predetermined extent for indicating to the operator the extent to which the stud has been driven under minimum torque drive and under maximum torque drive.

5. A stud screwing and testing machine comprising a collet having jaws for receiving a threaded stud, a chuck for clamping the jaws on the stud, means for driving the chuck and collet, said driving means including a low speed drive and a high speed drive and a selective driving clutch for connecting the drive to low or high speed, and common control mechanism for controlling said clutch and for controlling the chuck and collet, said control mechanism being movable to a plurality of predetermined positions to move the chuck to operative position on the collet jaws at high speed and to operative or inoperative positions at low speed.

6. In a stud driving machine, a chuck movable toward and from the work, said chuck having jaws for gripping the stud, said jaws being fixed relative to the chuck when gripping the stud means for driving the chuck, and means loosely carried by the chuck and normally freely rotatable thereon and having a portion extending below the chuck and between the chuck and the work and adapted to be clamped between the chuck and the work for indicating to the operator the extent to which the stud has been driven and the fit of the stud in the work.

WILHELM B. BRONANDER.